C. P. STEINMETZ.
RECTIFYING SYSTEM FOR ALUMINUM CELL LIGHTNING ARRESTERS.
APPLICATION FILED SEPT. 13, 1910.
987,924.
Patented Mar. 28, 1911.
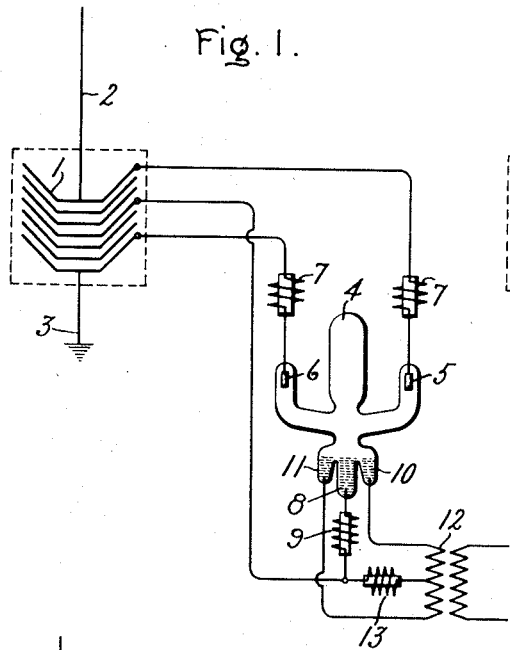
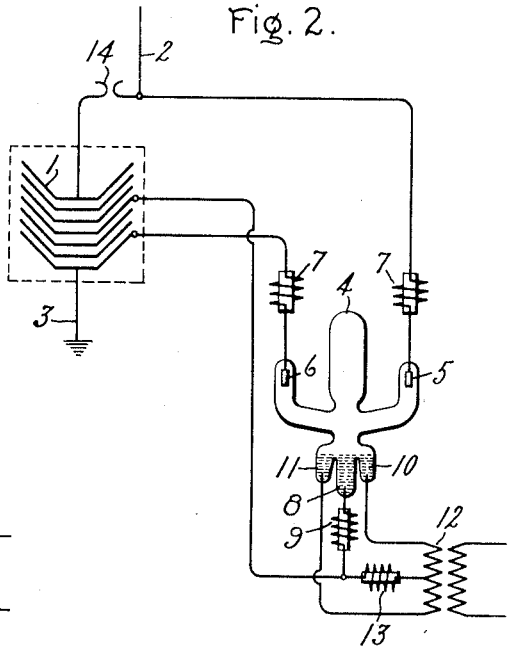
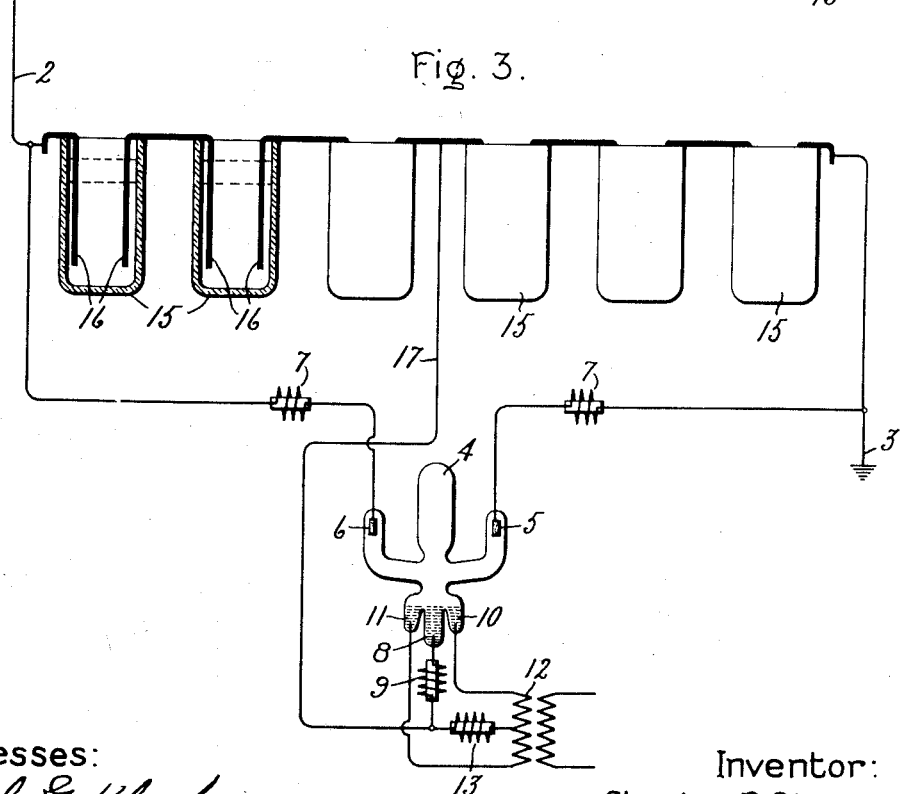
Witnesses:
Earl G. Klock.
J. Ellis Glen.
Inventor:
Charles P. Steinmetz
by Albert G. Davis
His Attorney

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

RECTIFYING SYSTEM FOR ALUMINUM-CELL LIGHTNING-ARRESTERS.

987,924.  Specification of Letters Patent.  Patented Mar. 28, 1911.

Application filed September 13, 1910. Serial No. 581,840.

*To all whom it may concern:*

Be it known that I, CHARLES P. STEINMETZ, a citizen of the United States, residing at Schenectady, county of Schenectady, State of New York, have invented certain new and useful Improvements in Rectifying System for Aluminum-Cell Lightning-Arresters, of which the following is a specification.

This invention relates to electrolytic condensers, and particularly to electrolytic lightning arresters of the aluminum cell type.

It has been found that when a lightning arrester of the aluminum cell type is subjected to an alternating current it rapidly deteriorates, whereas if the current be direct or pulsating the arrester lasts much longer, and therefore it has been proposed to combine with a lightning arrester of this type some suitable mechanical rectifying apparatus for the purpose of supplying to the aluminum cells a pulsating unidirectional current instead of the alternating current of the line. For some purposes some other type of rectifier is better than a mechanical rectifier, and the object of the present invention is to permit some type of rectifier without moving parts, such for instance as a mercury arc rectifier, to be used to impress the desired unidirectional voltage on the cell, so that troubles incident to moving mechanism and the nice regulation required to keep said mechanism in phase with the alternating current are overcome.

In the accompanying drawing, in which some of the various forms in which the invention may be embodied are shown merely to illustrate the invention, Figure 1 is a diagram showing the combination of a mercury arc rectifier with an aluminum cell lightning arrester; Fig. 2 is a diagram of a similar system including a spark gap in series with the arrester, and Fig. 3 is a diagram of a system similar to Fig. 1, but showing a different kind of aluminum cell.

The lightning arrester shown in Figs. 1 and 2 consists of a number of aluminum cups nested together and having some suitable electrolyte in the cups. The upper cup is connected to line at 2, and the lower cup is grounded at 3. If the alternating potential of the line is impressed directly upon such an arrester there will be a certain leakage discharge through the arrester which heats the electrolyte excessively, and in a few hours causes it to boil, a condition which soon causes the destruction of this type of aluminum cell. A pulsating unidirectional current, on the other hand, has practically no destructive effect when it flows through the cells, and therefore gives a long life to the cells. To obtain such a current through the arrester, I provide some suitable rectifier without moving parts, such as a mercury rectifier 4, which is shown as a rectifier of well known construction with anodes 5 and 6 connected respectively with the upper and lower terminals of the lightning arrester through suitable reactances 7. The cathode 8 of the rectifier is connected through a reactance 9 to some suitable point, preferably the middle point or cell of the arrester. The rectifier is provided with the customary starting anodes 10 and 11 connected to a suitable source of power, such as the secondary coil of a transformer 12 whose middle point is connected through the reactances 13 and 9 to the cathode 8.

With the circuit connections shown a unidirectional voltage is impressed upon the arrester between the middle of the two ends, and is superimposed on the alternating voltage impressed upon the arrester by the line, so that the resultant voltages on the two halves of the arrester are unidirectional pulsating voltages, and consequently a pulsating unidirectional current flows through half the cells at each positive wave of the alternating line current, and a similar unidirectional current flows through the other half of the cells at each negative wave. A discharge of lightning will pass readily through the arrester, but is effectually kept out of the rectifier by the reactances 7.

In Fig. 2 I have shown a spark gap 14 in series with the arrester with the rectifier connected in shunt to said gap as well as to the arrester. The gap, however, is readily jumped by lightning, which passes off by way of the arrester, as in the arrangement shown in Fig. 1.

Fig. 3 illustrates the application of the mercury rectifier to a different kind of electrolytic lightning arrester. The cells 15 are jars of glass or the like filled with a suitable electrolyte in which the aluminum electrodes 16 dip. The cells are connected in series, one terminal of the battery being connected to the line 2, and the other terminal to ground 3. The mercury rectifier 4 is shunted across the battery terminals, and its cathode lead 17 is connected in between the two middle cells of said battery, and as in the arrangement shown in Fig. 1, the unidirectional current in this lead flows through one-half of the battery during the positive wave and then through the other half during the negative wave of the alternating line current.

The employment of a mercury arc rectifier results in a perfectly automatic supply of pulsating unidirectional current through the battery without any necessity of that careful adjustment and oversight to insure exact phase relations which is called for by mechanical rectifiers.

The device is not thrown out of operation by a change in frequency of the line current, and consumes an amount of energy which is small, but is sufficient to keep the films in good resistant condition.

Although I have described the principle of operation of my invention together with the apparatus which I now consider to represent the best embodiment thereof, I desire to have it understood that the apparatus shown is only illustrative and that the invention can be carried out by other means; and that I intend to cover by the appended claims all changes and modifications within the scope of my invention.

What I claim as new and desire to secure by Letters Patent of the United States is:—

1. The combination with an electrolytic lightning arrester for an alternating current system, of a mercury arc rectifier connected to derive a unidirectional potential from said system and to impress it on said arrester.

2. The combination with an electrolytic lightning arrester for an alternating current system, of a vapor rectifier in shunt thereto for impressing a unidirectional potential on said arrester.

3. The combination with an electrolytic lightning arrester for an alternating current system, of a vapor rectifier having its anodes connected to the terminals of said arrester, and its cathode connected to an intermediate point in said arrester.

4. The combination with an electrolytic lightning arrester for an alternating current system, of a mercury rectifier having its anodes connected to the terminals of said arrester and its cathode connected to an intermediate point in said arrester, and reactances interposed between said rectifier and the arrester terminals.

5. The combination with an electrolytic lightning arrester for an alternating current system, of a spark gap in series with said arrester, and a rectifier in shunt to said gap and arrester for impressing a unidirectional potential on said arrester.

6. The combination with an alternating current system, of electrodes separated by electrolyte and connected to said system, and means for combining with the alternating potential of said system a unidirectional potential to maintain between said electrodes a unidirectional resultant potential.

In witness whereof, I have hereunto set my hand this 12th day of September, 1910.

CHARLES P. STEINMETZ.

Witnesses:
BENJAMIN B. HULL,
HELEN ORFORD.